US00RE49969E

(19) United States
(12) Reissued Patent
Lee et al.

(10) Patent Number: US RE49,969 E
(45) Date of Reissued Patent: May 14, 2024

(54) METHOD AND APPARATUS FOR CONFIGURING CONNECTION BETWEEN DEVICES IN COMMUNICATION SYSTEM

(71) Applicant: Samsung Electronics Co., Ltd., Gyeonggi-do (KR)

(72) Inventors: Soo-Yong Lee, Gyeonggi-do (KR); Byung-Moo Lee, Seoul (KR); Joo-Yeol Lee, Gyeonggi-do (KR); Dong He, Gyeonggi-do (KR)

(73) Assignee: Samsung Electronics Co., Ltd (KR)

(21) Appl. No.: 17/521,382

(22) Filed: Nov. 8, 2021

Related U.S. Patent Documents

Reissue of:
(64) Patent No.: 10,477,389
Issued: Nov. 12, 2019
Appl. No.: 15/076,138
Filed: Mar. 21, 2016

(30) Foreign Application Priority Data

Mar. 19, 2015 (KR) ..... 10-2015-0038487

(51) Int. Cl.
*H04W 12/30* (2021.01)
*H04W 4/70* (2018.01)
(Continued)

(52) U.S. Cl.
CPC ..... *H04W 12/35* (2021.01); *H04W 12/50* (2021.01); *H04W 4/70* (2018.02); *H04W 8/005* (2013.01);
(Continued)

(58) Field of Classification Search
CPC ..... H04W 12/50; H04W 12/35; H04W 4/70; H04W 84/12; H04W 88/04; H04W 88/005; H04W 48/16
See application file for complete search history.

(56) References Cited

U.S. PATENT DOCUMENTS 7,734,044 B2 * 6/2010 Fritz ..... H04L 29/06027 380/255
8,683,204 B2 * 3/2014 Kolesnikov ..... G09C 1/00 713/159
(Continued)

FOREIGN PATENT DOCUMENTS

CN 101420694 4/2009
CN 103249010 8/2013
(Continued)

OTHER PUBLICATIONS

Chinese Office Action dated Nov. 27, 2019 issued in counterpart application No. 2w01680016688.X, 61 pages.
(Continued)

*Primary Examiner* — Jalatee Worjloh
(74) *Attorney, Agent, or Firm* — The Farrell Law Firm, P.C.

(57) ABSTRACT

Disclosed are a communication scheme and a system thereof for converging an IoT technology and a 5G communication system for supporting a high data transmission rate beyond that of a 4G system. A method and an apparatus for configuring a connection with a second device, which provides access to a network, by a first device in a communication system, is provided. The method includes discovering the second device supporting a neighbor awareness network (NAN) and located within a predetermined range from the first device, exchanging an ephemeral key of the first device for identifying the first device and an ephemeral key of the second device for identifying the second device, and performing a secure connection between the first device and the second device.

23 Claims, 10 Drawing Sheets

(51) Int. Cl.

| | |
|---|---|
| ***H04W 8/00*** | (2009.01) |
| ***H04W 12/50*** | (2021.01) |
| ***H04W 48/16*** | (2009.01) |
| ***H04W 84/12*** | (2009.01) |
| ***H04W 88/04*** | (2009.01) |

(52) U.S. Cl.
CPC ..... *H04W 48/16* (2013.01); *H04W 84/12* (2013.01); *H04W 88/04* (2013.01)

(56) References Cited

U.S. PATENT DOCUMENTS

| | | | | |
|---|---|---|---|---|
| 9,544,376 | B1 * | 1/2017 | Lambert | H04L 63/061 |
| 9,544,754 | B1 * | 1/2017 | Lambert | H04W 8/005 |
| RE49,012 | E * | 4/2022 | Harkins | G09C 5/00 |
| 2006/0117181 | A1 * | 6/2006 | Brickell | H04L 9/0844 713/176 |
| 2007/0043946 | A1 * | 2/2007 | Lauter | H04L 9/0844 713/171 |
| 2007/0055880 | A1 * | 3/2007 | Lauter | H04L 9/0844 713/171 |
| 2011/0078025 | A1 * | 3/2011 | Shrivastav | G06Q 20/02 705/14.64 |
| 2012/0076301 | A1 * | 3/2012 | Kanter | H04K 1/02 380/256 |
| 2012/0078548 | A1 * | 3/2012 | Salazar | G01D 4/02 702/62 |
| 2012/0155640 | A1 * | 6/2012 | Cotner | H04L 9/001 380/252 |
| 2013/0109323 | A1 * | 5/2013 | Ruutu | H04B 5/0031 455/68 |
| 2013/0185400 | A1 | 7/2013 | Larson et al. | |
| 2013/0201957 | A1 * | 8/2013 | Van Phan | H04W 4/70 370/329 |
| 2013/0243194 | A1 * | 9/2013 | Hawkes | H04L 9/0838 380/270 |
| 2013/0272134 | A1 * | 10/2013 | Miller | H04L 63/104 370/241 |
| 2014/0082205 | A1 | 3/2014 | Abraham et al. | H04L 65/1069 709/227 |
| 2014/0254569 | A1 | 9/2014 | Abraham et al. | |
| 2015/0036540 | A1 | 2/2015 | Kasslin et al. | |
| 2015/0043377 | A1 | 2/2015 | Cholas et al. | |
| 2015/0065044 | A1 | 3/2015 | Dua | |
| 2015/0071121 | A1 | 3/2015 | Patil et al. | |
| 2015/0098388 | A1 | 4/2015 | Fang et al. | |
| 2015/0200811 | A1 * | 7/2015 | Kasslin | H04L 41/12 370/254 |
| 2015/0312381 | A1 * | 10/2015 | Savolainen | H04L 51/38 709/204 |
| 2015/0319149 | A1 * | 11/2015 | Alshammari | H04L 9/0869 713/171 |
| 2015/0350866 | A1 * | 12/2015 | Patil | H04W 40/244 370/254 |
| 2016/0057237 | A1 * | 2/2016 | Yang | H04L 67/16 709/224 |
| 2016/0073398 | A1 * | 3/2016 | Batchu | H04W 72/0446 455/424 |
| 2016/0286395 | A1 * | 9/2016 | Adrangi | H04W 12/50 |
| 2016/0366578 | A1 * | 12/2016 | Abraham | H04W 8/005 |
| 2019/0037619 | A1 * | 1/2019 | Qi | H04L 67/51 |

FOREIGN PATENT DOCUMENTS

| | | |
|---|---|---|
| CN | 103797830 | 5/2014 |
| CN | 104349285 | 2/2015 |
| EP | 2 756 969 | 7/2014 |
| WO | WO 2013/040046 | 3/2013 |
| WO | WO 2014/150977 | 9/2014 |
| WO | WO 2014/185954 | 11/2014 |
| WO | WO 2015/021780 | 2/2015 |

OTHER PUBLICATIONS

European Search Report dated Apr. 29, 2021 issued in counterpart application No. 16765290.8-1212, 14 pages.
International Search Report dated Jul. 22, 2016 issued in counterpart application No. PCT/KR2016/002755, 13 pages.
European Search Report dated Feb. 23, 2018 issued in counterpart application No. 16765290.8, 5 pages.
European Search Report dated Oct. 11, 2018 issued in counterpart application No. 16765290.8-1214, 6 pages.
Vyas, Pranav et al., An Analysis of Session Key Exchange Protocols, International Journal of Engineering Research and Applications, vol. 2, Issue 4, Jun.-Jul. 2012, pp. 658-663.
Junaid, Muhammad et al., Per Packet Authentication for IEEE 802.11 Wireless LAN, Proceedings of the 12th IEEE Int'l Multitopic Conference, Dec. 23-24, 2008, pp. 207-212.

* cited by examiner

METHOD AND APPARATUS FOR CONFIGURING CONNECTION BETWEEN DEVICES IN COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a Reissue Application of application Ser. No. 15/076,138 now U.S. Pat. No. 10,477,389.*

PRIORITY

This application claims priority under 35 U.S.C. § 119(a) to Korean Patent Application No. 10-2015-0038487 filed in the Korean Intellectual Property Office on Mar. 19, 2015, the entire content of which is incorporated herein by reference.

BACKGROUND

1. Field of the Disclosure

The present disclosure relates generally to a method and an apparatus for configuring an initial connection between devices based on a Neighbor Awareness Network (NAN) in a communication system.

2. Description of the Related Art

In order to meet wireless data traffic demands that have increased after the commercialization of $4^{th}$ Generation (4G) communication systems, efforts to develop an improved $5^{th}$ Generation (5G) communication system or a pre-5G communication system have been made. For this reason, the 5G communication system or the pre-5G communication system is called a beyond 4G network communication system or a post LTE system.

In order to achieve a high data transmission rate, implementation of the 5G communication system in an mmWave band (for example, 60 GHz band) is being considered. In the 5G communication system, technologies such as beamforming, massive Multi-Input Multi-Output (MIMO), Full Dimensional MIMO (FD-MIMO), array antenna, analog beam-forming, and large scale antenna are discussed to mitigate propagation path loss in the mmWave band and increase propagation transmission distance.

Further, technologies, such as an evolved small cell, an advanced small cell, a cloud Radio Access Network (cloud RAN), an ultra-dense network, Device to Device communication (D2D), a wireless backhaul, a moving network, cooperative communication, Coordinated Multi-Points (CoMP), and interference cancellation to improve the system network, have been developed for the 5G communication system.

In addition, Advanced Coding Modulation (ACM) schemes, such as Hybrid FSK and QAM Modulation (FQAM) and Sliding Window Superposition Coding (SWSC), and advanced access technologies, such as Filter Bank Multi Carrier (FBMC), Non Orthogonal Multiple Access (NOMA), and Sparse Code Multiple Access (SCMA), have been developed for the 5G system.

Meanwhile, the Internet has evolved to an Internet of Things (IoT) network in which distributed components, such as objects, exchange and process information from a human-oriented connection network in which humans generate and consume information. Internet of Everything (IoE) technology may be an example of a combination of the IoT technology and big data processing technology through a connection with a cloud server.

In order to implement the IoT, research is being conducted on technical factors, such as a sensing technique, wired/wireless communication and network infrastructure, service interface technology, and security technology are required, and thus technologies such as a sensor network, Machine to Machine (M2M), Machine Type Communication (MTC), etc. are required for a connection between objects.

In an IoT environment, through collection and analysis of data generated in connected objects, an Internet Technology (IT) service to create new value for people's lives may be provided. The IoT may be applied to fields such as a smart home, smart building, smart city, smart car, connected car, smart grid, health care, smart home appliance, health care service, etc. through the convergence of the conventional information technologies and various industries.

Accordingly, various attempts to apply the 5G communication to the IoT network are made. For example, 5G communication technologies, such as a sensor network, Machine to Machine (M2M), and MTC, are implemented by various schemes, such as beamforming, MIMO, and array antenna. The application of a cloud RAN as the big data processing technology is an example of convergence of the 5G technology and the IoT technology.

In a recent communication system, Near Field Communication (NFC) and Quick Response (QR) codes are used for security communication between devices located within a short distance. For example, as illustrated in FIG. 1, a connection between devices may be configured using a QR code in a communication system.

FIG. 1 illustrates a method of configuring an initial connection between devices in a conventional communication system.

Referring to FIG. 1, a water heater 101, a terminal 103, and an Access Point (AP) are provided in a conventional communication system. When a user desires to control the water heater 101 through the terminal 103, the terminal 103 requires that the water heater 101 initially subscribe to the Access Point (AP) 105.

To this end, in FIG. 1(a) and FIG. 1(b), when the water heater 101 is connected to a power supply, the terminal 103 scans for a QR code of the water heater 101, identifies information on the water heater 101 stored in the scanned QR code, and transfers a Service Set ID (SSID) and credential of the AP 105 connected to the terminal 103 to the water heater 101 through Wi-Fi. Then, in FIG. 1(c), the water heater 101 is connected to the AP 105 and communicates with the AP 105 based on the received SSID and the credential of the AP 105.

Accordingly, when an NFC or a QR code is used for communication between devices, either an NFC module or a QR code must be mounted or attached to all devices for the connection. Further, the user is required to perform NFC tagging or scanning of a QR code on the device to manually connect the device, which is cumbersome for the user.

Accordingly, a method of configuring an initial connection between devices through device proximity and automatic recognition in the communication system is required.

SUMMARY

The present disclosure has been made to address at least the above-mentioned problems and/or disadvantages, and to provide at least the advantages described below.

Accordingly, an aspect of the present disclosure is to provide a method and an apparatus for configuring an initial connection between devices in a communication system.

Accordingly, another aspect of the present disclosure is to provide a method and an apparatus for configuring an initial connection between devices based on a neighbor awareness network (NAN) in a communication system.

In accordance with an aspect of the present disclosure, a method of configuring a connection with a second device, which provides access to a network, by a first device in a communication system is provided. The method includes discovering the second device supporting a neighbor awareness network (NAN) and located within a predetermined range from the first device, exchanging an ephemeral key of the first device for identifying the first device and an ephemeral key of the second device for identifying the second device, and performing a secure connection between the first device and the second device.

In accordance with another aspect of the present disclosure, a method of configuring a connection with a first device by a second device which provides access to a network in a communication system is provided. The method includes exchanging an ephemeral key of the first device for identifying the first device and an ephemeral key of the second device for identifying the second device, and performing a secure connection between the first device and the second device, wherein the second device supports a neighbor awareness network (NAN) and is located within a predetermined range value from the first device.

In accordance with another aspect of the present disclosure, an apparatus for configuring a connection with a second device, which provides access to a network, by a first device in a communication system is provided. The apparatus includes a controller and a transceiver. The controller makes a control to discover the second device supporting a neighbor awareness network (NAN) and located within a predetermined range value from the first device, exchange an ephemeral key of the first device for identifying the first device and an ephemeral key of the second device for identifying the second device, and performing a secure connection between the first device and the second device from the second device. The transceiver receives the encrypted configuration data from the second device.

In accordance with another aspect of the present disclosure, an apparatus for configuring a connection with a first device by a second device, which provides access to a network in a communication system is provided. The apparatus includes a controller and a transceiver. The controller makes a control to exchange an ephemeral key of the first device for identifying the first device and an ephemeral key of the second device for identifying the second device, and performing a secure connection between the first device and the second device. The transceiver transmits the encrypted configuration data to the first device. The second device supports a neighbor awareness network (NAN) and is located within a predetermined range value from the first device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
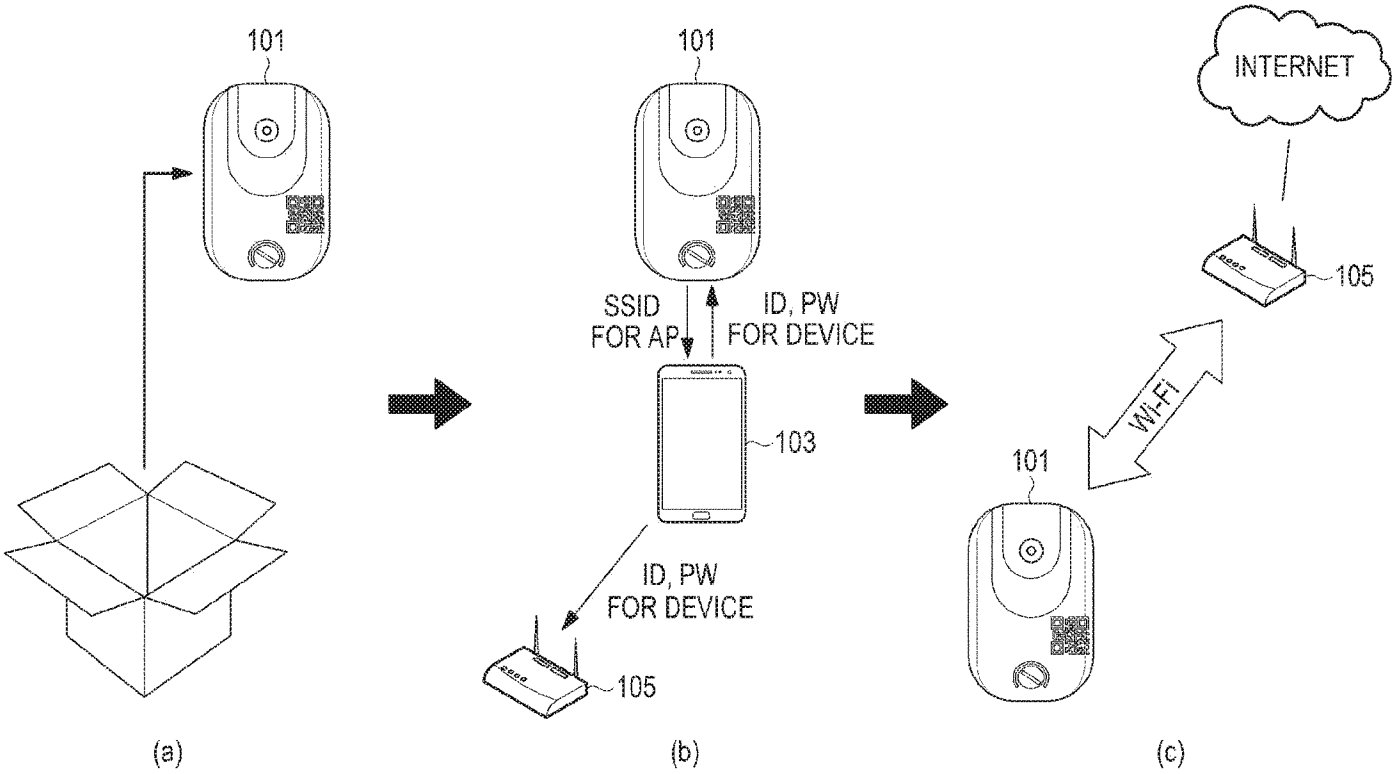
FIG. 1 (PRIOR ART)
FIG. 1 illustrates a method of configuring an initial connection between devices in a conventional communication system.

Hereinafter, embodiments of the present disclosure will be disclosed with reference to the accompanying drawings in which similar reference numerals are used to refer to like elements. The following detailed described is provided to help in understanding various embodiments of the present disclosure defined by the claims and the equivalents thereof. Although the following detailed description includes various specific explanations to assist with understanding, they are considered to be only examples. Accordingly, those skilled in the art may recognize that various modifications and changes of the various embodiments described herein can be made without departing from the range and scope of the present disclosure. Further, descriptions of the known functions and elements may be omitted for clarity and brevity.

The terms and words used in the following detailed description and the claims are not limited to literal meanings, and are simply used for helping obtain a clear and consistent understanding of the present disclosure of the disclosure.

Further, it will be appreciated that singular expressions such as “an” and “the” include plural expressions as well, unless the context clearly indicates otherwise. Accordingly, as an example, a “component surface” includes one or more component surfaces.

Although the terms used herein, including ordinal numbers such as first, second, etc., can be used for describing various elements, the structural elements are not restricted by the terms. The terms are used merely for the purpose to distinguish an element from another elements. For example, a first element could be referred to as a second element, and similarly, a second element could be referred to as a first element without departing from the scope of the present disclosure. As used herein, the term "and/or" includes any and all combinations of one or more associated items.

The terms used in the present disclosure are only used to describe specific embodiments, and are not intended to limit the present disclosure. In the present disclosure, terms such as "include" and/or "have" may be construed to denote a certain characteristic, number, step, operation, constituent element, component, or a combination thereof, but should not be construed to exclude the existence of or a possibility of the addition of one or more other characteristics, numbers, steps, operations, constituent elements, components or combinations thereof.

Unless defined otherwise, all terms used herein, including technical and scientific terms, have the same meaning as commonly understood by those of skill in the art to which the present disclosure pertains. Such terms as those defined in a generally used dictionary are to be interpreted to have meanings equivalent to the contextual meaning in the relevant field of art.

Terms such as "include", "comprise", and derivatives thereof may mean inclusion without limitation. The term "or" may have an inclusive meaning and means "and/or". The terms "associated with", "associated therewith", and derivatives thereof, may mean to include, be included within, interconnect with, contain, be contained within, connected to or with, coupled to or with, be communicable with, cooperate with, interleave, juxtapose, be proximate to, be bound to or with, have, and have a property of. The term "controller" may mean any device, system, or a part thereof that controls at least one operation, and such a device may be implemented in hardware, firmware, or software, or some combinations of at least two of the same. It should be noted that the functionality associated with any particular controller may be centralized or distributed, whether locally or remotely.

Definitions for certain words and phrases are provided throughout this disclosure, those skilled in the art should understand that in many, if not most instances, such definitions apply to prior, as well as future uses of such defined words and phrases.

The present disclosure can be applied to intelligent services (for example, services related to a smart home, smart building, smart city, smart car, connected car, health care digital education, retail business, security, and safety) based on the 5G communication technology and the IoT-related technology.

The present disclosure relates generally to a method by which a device (i.e., a station (STA)) that supports a NAN supports the NAN and configures a connection with another device located within a short distance (that is, within a predetermined range value) from the STA. The various embodiments of the present disclosure may be implemented in a first scenario, in which the STA directly makes a request for subscribing to the AP. Alternatively, the embodiments may be implemented in another scenario, in which the STA receives permission for a subscription from the AP existing within a predetermined range value.

Further, the embodiments of the present disclosure may be implemented by a case where the AP supports the NAN and a case where the AP does not support the NAN according to the type or function of the AP.

Hereinafter, a device (that is, the STA) that needs to configure securely to allow access to a network is defined as a subscription requesting device (hereinafter, referred to as an enrollee); a device (that is, the AP) that provides the access to the network is defined as a subscription allowing device (hereinafter, referred to as an enroller); and a device that controls the enrollee to communicate with the enroller is defined as a configuring device (hereinafter, referred to as a configurator).

Figure 2:
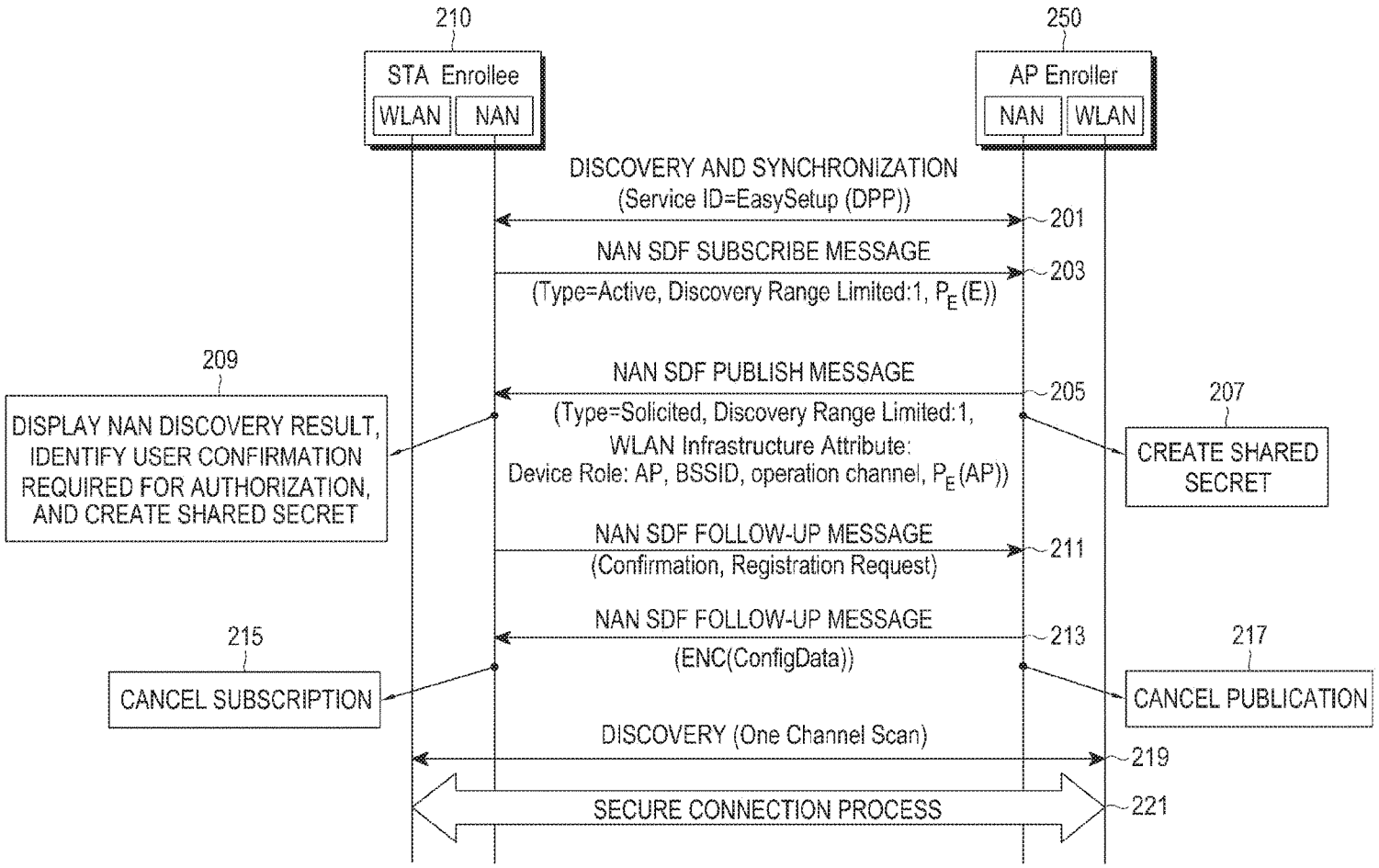
FIG. 2 is a signal flow diagram of a method of configuring a connection between devices in a communication system, according to an embodiment of the present disclosure.

FIG. 2 is a signal flow diagram of a method of configuring a connection between devices in a communication system, according to an embodiment of the present disclosure.

Referring to FIG. 2, a method of configuring a connection between a STA and an AP when the AP supports a NAN and the STA directly makes a request for subscribing to the AP is provided. When both the STA and the AP support the NAN, an enrollee 210 in the STA requests for subscribing to the AP, and an enroller 250 in the AP accepts the subscription of the STA.

In step 201, the enrollee 210 supports the NAN based on NAN sync beacons, discovers a neighboring device, for example, the enroller 250, located within a predetermined range from the enrollee 210, and performs synchronization with the discovered enroller 250. At this time, when a list of service IDs includes a service ID of an initial connection setup (e.g., easy setup) service (e.g., Service ID=EasySetup (Device Provisioning Protocol (DPP)), the enrollee 210 performs processes for configuring a next initial connection.

In step 203, the enrollee 210 transmits a NAN Service Discovery Frame (SDF) subscribe message, which makes a request for subscribing to the enroller 250, to the enroller 250. The NAN SDF subscribe message includes at least one of a type of the NAN SDF subscribe message (e.g., Type=Active), which indicates the request for subscribing to the enroller 250, a value of the range within which the discovery is possible (e.g., Discovery Range Limited:1), and an ephemeral key value (e.g., PE(E)) and a random value (e.g., NonceE) of the enroller 250.

Type=Active indicates the type of the NAN SDF subscribe message. When the type is configured as active, the enrollee 210 can transmit the NAN SDF subscribe message even though the enrollee 210 has not first received a NAN SDF publish message, which indicates that access can be provided to the network from the enroller 250.

Discovery Range Limited:1 indicates that a request for processing the NAN SDF subscribe message is to be made only when a Received Signal Strength Indication (RSSI) is higher than or equal to a predetermined RSSI threshold value (hereinafter, RSSI_Close value), and only devices within the discovery range can receive the NAN SDF subscribe message.

PE(E) is an ephemeral key value and is determined based on Equation (1) below.

$$PE(E)=NonceE*PI(E) \quad (1)$$

In Equation (1), the NonceE is a random nonce, and PI(E) denotes a unique identity key of the enrollee 210. The random nonce is a random value which can be used one time. A local time of the enrollee 210 is generated as a seed, and a new value is generated to prevent a replay attack when a predetermined time passes.

In step 205, the enroller 250 receives the NAN SDF subscribe message and transmits a NAN SDF publish message indicating that access can be provided to the network to the enrollee 210. The NAN SDF publish message includes at least one of the type of the NAN SDF publish message (e.g., Type=Solicited) indicating that access can be provided to the network, Discovery Range Limited:1, information on attributes (e.g., Wireless Local Area Network (WLAN) Infrastructure Attribute) indicating to have WLAN connection attributes, information on a role of the enroller 250 (e.g., Device Role:AP), a Basic Service Set ID (BSSID) of the corresponding network, information on a channel of the corresponding WLAN (i.e., an operation channel), and an ephemeral key value (e.g., PE(AP)) and a random value (e.g., NonceE) of the enroller 250.

Type=Solicited indicates the type of the NAN SDF publish message. When the type is configured as solicited, the enroller 250 may first receive the NSN SDF subscribe message from the enrollee 210 and then transmit the NAN publish message only when service information provided from the enrollee 210 is the same.

Discovery Range Limited:1 indicates that a request for processing the NAN publish message is to be made only when an RSSI value of the NAN publish message is higher than or equal to an RSSI_Close value, and only devices within the range can receive the NAN SDF publish message.

WLAN Infrastructure Attribute denotes a value defined in the NAN standard and indicates that the corresponding device has the WLAN connection attributes.

Device Role:AP indicates that the AP transmits the NAN SDF publish message.

PE(AP) is an ephemeral key value and is determined by the enroller 250 based on Equation (2) below.

$$PE(AP)=NonceE*PI(AP) \quad (2)$$

In Equation (2), NonceE is a random value extracted from the received NAN SDF subscribe message, and PI(AP) denotes a unique identity key of the enrollee 250.

In step 207, the enroller 250 creates a shared secret with the enrollee 210 after transmitting the NAN SDF publish message.

In step 209, the enrollee 210 receives the NAN SDF publish message from the enroller 250, displays a NAN discovery result on the screen, identifies user confirmation required for authorization, and creates the shared secret.

In step 211, the enrollee 210 transmits to the enroller 250, a NAN SDF follow-up message indicating that subscription to the enroller 250 is confirmed. The NAN SDF follow-up message includes information on confirmation indicating that the user confirmation required for authorization and the shared secret key creation have been completed. The NAN SDF follow-up message may further include a registration request. The registration request indicates a request for the role as a configurator by the corresponding enrollee 210, which requests permission to connect with another enrollee instead in the future.

In step 213, the enroller 250 identifies an acceptance status of the subscription of the enrollee 210 and transmits the NAN SDF follow-up-message including configuration data (e.g., ConfigData) to the enrollee 210. The ConfigData is encrypted by the shared secret (for example, a Pairwise Master Key: PMK).

In step 215, the enrollee 210 cancels the subscription, and in step 217, the enroller 250 cancels the publication with the enrollee 210 to allow a subscription with another device.

In step 219, the enrollee 210 and the enroller 250 perform discovery through one channel scan.

In step 221, the enrollee 210 and enroller 250 perform a secure connection by using the configuration data (e.g., ConfigData).

Accordingly, in the method of configuring the connection between devices where an STA directly makes a request for subscribing to an AP, when the AP supports the NAN, the enrollee 210 of the STA directly makes a request for subscribing to the enroller 250 of the AP and configures the connection with the enroller 250 of the AP.

Figure 3:
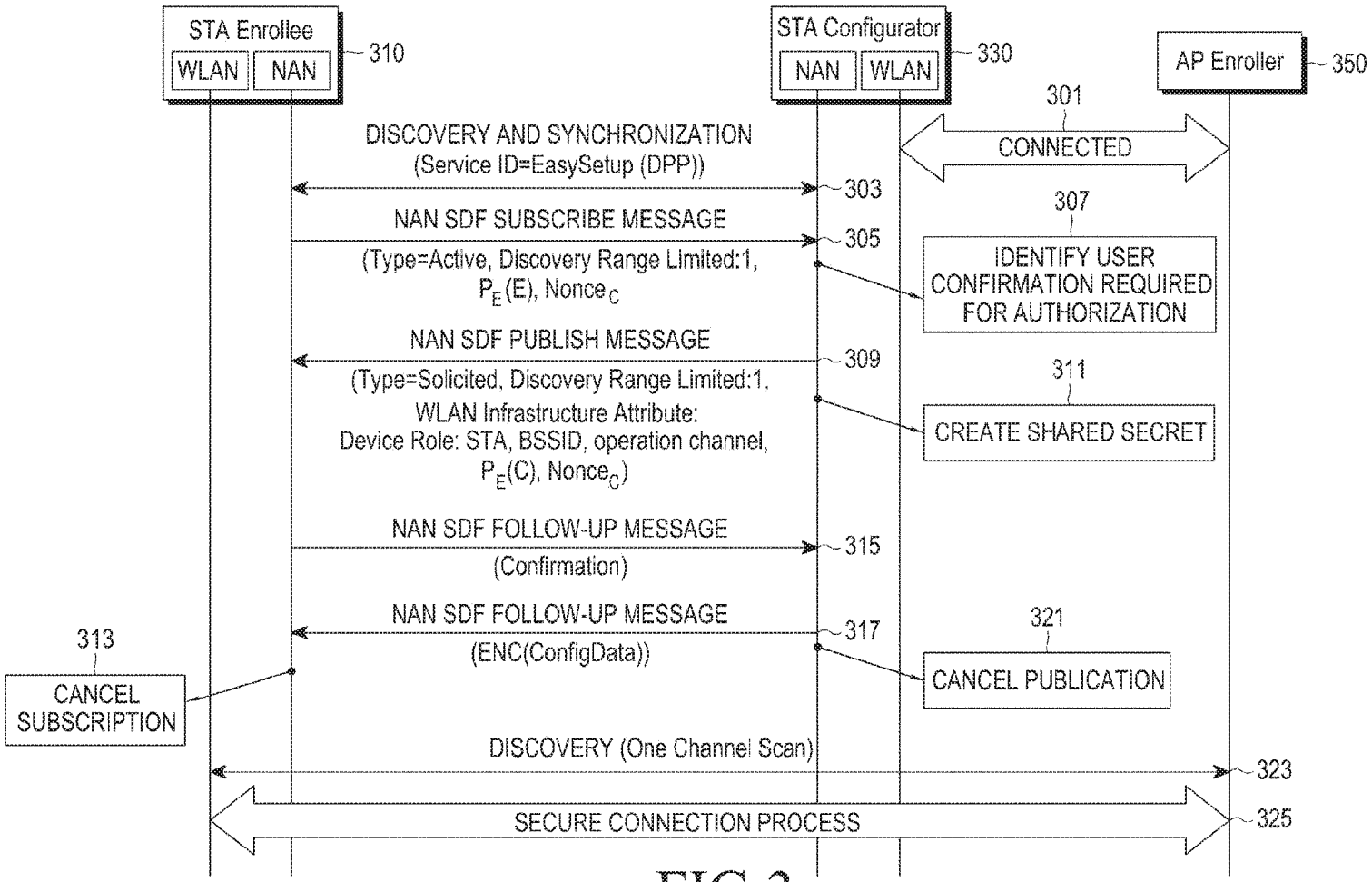
FIG. 3 is a signal flow diagram of a method of configuring a connection between devices in a communication system, according to an embodiment of the present disclosure.

FIG. 3 is a signal flow diagram of a method of configuring a connection between devices in a communication system, according to an embodiment of the present disclosure.

Referring to FIG. 3, a method of configuring a connection between a STA and an AP using another device (i.e., a configurator) when the AP cannot support a NAN and the STA directly makes a request for subscribing to the AP is provided. When the STA supports the NAN but the AP cannot support the NAN, a device of the STA that makes a request for subscribing to the AP corresponds to an enrollee 310, and a device that accepts the subscription to the AP corresponds to a configurator 330 connected to a device of the AP which corresponds to an enroller 350.

In the case when the AP cannot support the NAN the configurator 330, which can allow the AP to support the NAN, is used. In order for the configurator 330 to allow the AP to support the NAN, the configurator 330 and the enroller 350 are devices that are currently connected or have been previously connected to each other. Further, the configurator 330 performs an operation similar to that of the enroller 250 described with respect to FIG. 2.

In step 301, in a state where the configurator 330 and the enroller 350 are connected, the enrollee 310 supports the NAN based on NAN sync beacons.

In step 303, the enrollee 310 discovers a neighboring device, for example, the configurator 330, located within a predetermined range from the enrollee 310, and performs synchronization with the discovered configurator 330. At this time, when a list of service IDs includes a service ID of an initial setup (e.g., easy setup) service (e.g., Service ID=EasySetup (DPP)), the enrollee 310 performs processes for configuring a next initial connection.

In step 305, the enrollee 310 transmits, to the configurator 330, a NAN SDF subscribe message, which makes a request for subscribing to the configurator 330. The NAN SDF subscribe message includes at least one of Type=Active, Discovery Range Limited:1, PE(E), and NonceE.

In step 307, the configurator 330 receives the NAN SDF subscribe message and identifies user confirmation required for authorization. Further, the configurator 330 transfers a NAN SDF publish message to the enrollee 310. The NAN SDF publish message includes at least one of Type=Solicited, Discovery Range Limited:1, WLAN Infrastructure Attribute, Device Role: STA, BSSID, operation channel, PE(C), and NonceC.

In step 309, the enrollee 310 receives the NAN SDF publish message and creates the shared secret with the configurator 330.

In step 315, the enrollee 310 transmits, to the configurator 330, a NAN SDF follow-up message indicating the identification of the subscription to the configurator 330. The NAN SDF follow-up message includes information on confirmation indicating that the user confirmation required for authorization and the shared secret key creation have been completed.

The configurator 330 identifies an acceptance status of the subscription of the enrollee 310 and transmits the NAN SDF follow-up message including configuration data (e.g., ConfigData) to the configurator 330, in step 317. The ConfigData is encrypted by the shared secret (for example, a Pairwise Master Key: PMK).

In step 313, the enrollee 310 cancels the subscription, and in step 321, the enroller 350 cancels the publication with the enrollee 310 to allow another device to subscribe.

In step 323, the enrollee 310 and the enroller 350 perform discovery through one channel scan.

In step 325, the enrollee 310 and the enroller 350 perform a secure connection by using the configuration data (e.g., ConfigData).

Accordingly, in the method of configuring the connection between devices where an STA directly makes a request for subscribing to an AP and the AP cannot support the NAN, the enrollee 310 of the STA makes a request for subscribing to the configurator 330 of the STA connected to the enroller 350 of the AP, thereby making the connection with the enroller 350 of the AP.

Figure 4:
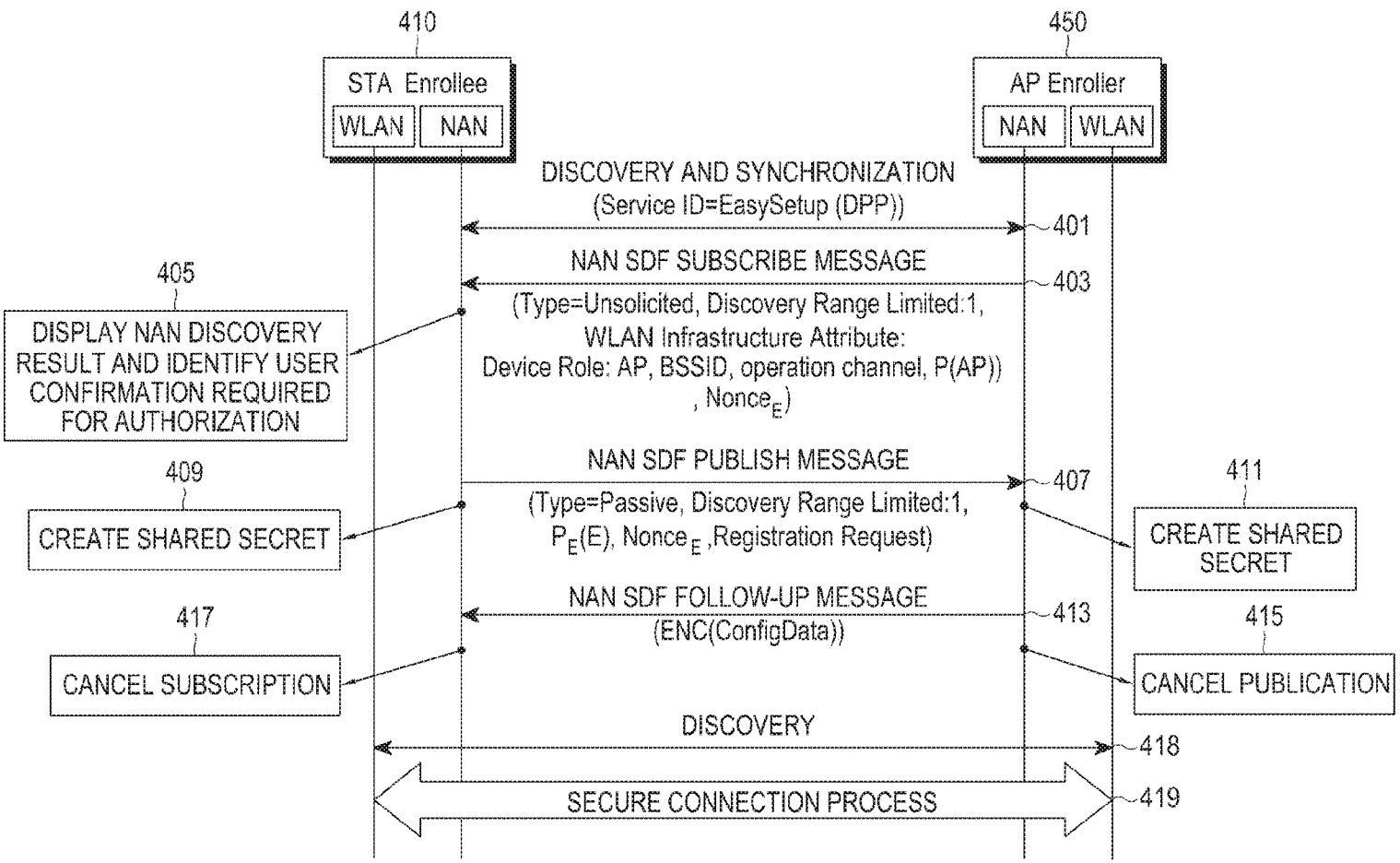
FIG. 4 is a signal flow diagram of a method of configuring a connection between devices in a communication system, according to an embodiment of the present disclosure.

FIG. 4 is a signal flow diagram of a method of configuring a connection between devices in a communication system, according to an embodiment of the present disclosure.

Referring to FIG. 4, a method of configuring a connection between a STA and an AP when the AP supports a NAN where the STA receives permission for a subscription from the AP is provided. When both the STA and the AP support the NAN, a device of the STA that makes a request for subscribing to the AP is an enrollee 410 of the STA and a device of the AP that accepts the subscription of the STA is an enroller 450 of the AP.

In step 410, the enrollee 410 discovers a neighboring device, for example, the enroller 450 located within a predetermined range from the enrollee 410, and perform synchronization with the discovered enroller 450 in step 401. At this time, when a list of service IDs includes a service ID of an initial setup (e.g., easy setup) service (e.g., Service ID=EasySetup (DPP)), the enrollee 410 performs next initial set processes.

In step 403, after the discovery and synchronization processes are completed, the enrollee 410 receives, from the enroller 450, a NAN SDF subscribe message indicating that access to the network can be provided. The NAN SDF subscribe message includes at least one of Type=Unsolicited, Discovery Range Limited:1, WLAN Infrastructure Attribute, Device Role:AP, BSSID, operation channel, PE(AP), and NonceE.

Type=Unsolicited indicates the type of the NAN SDF publish message. When the type is configured as unsolicited, the enroller 450 may first transmit the NAN SDF publish message without receiving the NAN SDF subscribe message.

Discovery Range Limited:1 indicates that a request for processing the NAN SDF subscribe message is to be made only when an RSSI value of the NAN SDF subscribe message is higher than or equal to an RSSI_Close value, and only devices within the discovery range can receive the NAN SDF publish message.

WLAN Infrastructure Attribute is a value defined in the NAN standard and indicates that the corresponding device has the WLAN connection attributes.

Device Role:AP indicates that the AP transmits the NAN SDF publish message.

PE(AP) is an ephemeral key value of the enroller 450 and is determined based on Equation (3) below.

$$PE(AP)=NonceE*PI(AP) \quad (3)$$

In Equation (3), NonceE is a random nonce, and the PI(AP) denotes a unique identity key of the enroller 450. The random nonce is a random value which can be used one time. A local time of the enroller 450 is generated as a seed, and a new value is generated to prevent a replay attack when a predetermined time passes.

In step 405, the enrollee 410 having received the NAN SDF subscribe message displays a NAN discovery result and identifies user confirmation required for authorization input by the user.

In step 407, the enrollee 410 transmits, to the enroller 450, a NAN SDF publish message indicating that the identification of the user confirmation required for authorization has been completed. The NAN SDF publish message includes at least one of Type=Passive, Discovery Range Limited:1, PE(E), NonceE, and Registration Request.

Type=Passive indicates the type of the NAN SDF publish message. When the type is configured as passive, the subscription to the enroller 450 of the AP has been identified.

PE(E) is an ephemeral key value and is determined by the enrollee 410 based on Equation (4) below.

$$PE(E)=NonceE*PI(E) \quad (4)$$

In Equation (4), NonceE is a random nonce, and the PI(E) denotes a unique identity key of the enrollee 410.

In steps 409 and 411, the enrollee 410 and the enroller 450, respectively, create a shared secret.

The enroller 450 having received the NAN SDF publish message from the enrollee 410 identifies an acceptance status of the subscription of the enrollee 410 and transmits the NAN SDF follow-up message including configuration data (e.g., ConfigData) to the enrollee 410, in step 413. The ConfigData is encrypted by the shared secret (for example, a Pairwise Master Key: PMK).

In step 415, the enroller 450 cancels the publication with the enrollee 410 to allow another device to subscribe, and in step 417 the enrollee 410 cancels the subscription.

In step 418, the enrollee 410 and the enroller 450 perform discovery through one channel scan.

In step 419, the enrollee 410 and the enroller 450 perform a secure connection by using the configuration data (e.g., ConfigData).

Accordingly, in the method of configuring the connection between devices where the STA receives permission for a subscription from the AP the AP supports the NAN, the connection with the enrollee of the STA can be configured based on the enroller of the AP notifying the enrollee of the STA of the provision of network access.

Figure 5:
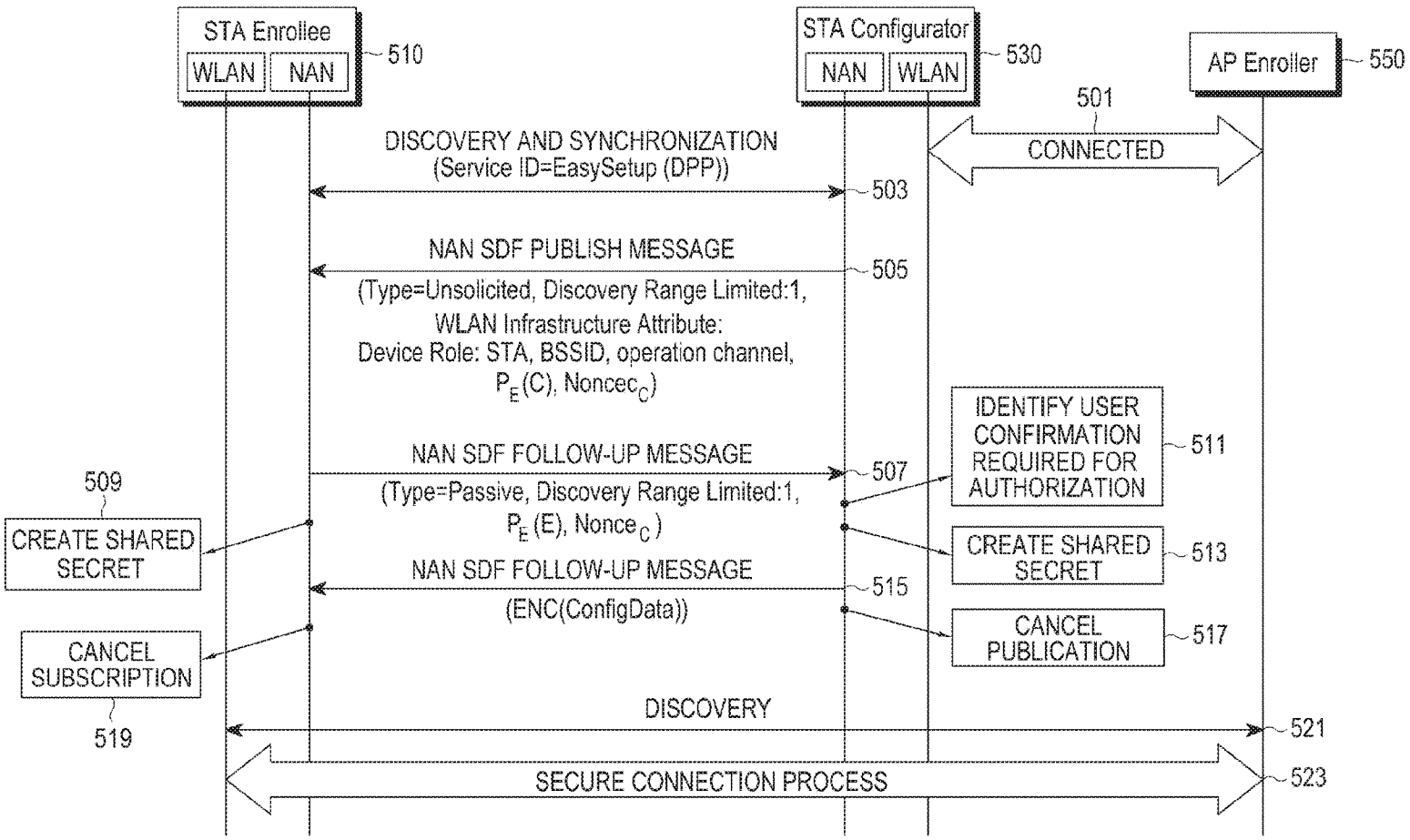
FIG. 5 is a signal flow diagram of a method of configuring a connection between devices in a communication system, according to an embodiment of the present disclosure.

FIG. 5 is a signal flow diagram of a method of configuring a connection between devices in a communication system, according to an embodiment of the present disclosure.

Referring to FIG. 5, a method of configuring a connection between a STA and an AP by using another device (i.e., configurator) where the STA receives permission for a subscription from the AP and the AP cannot support a NAN is provided. When the STA supports the NAN but the AP cannot support the NAN, a device of the STA that makes a request for subscribing to the AP corresponds to an enrollee 510, and a device that accepts the subscription to the AP corresponds to a configurator 530 connected to a device of the AP which corresponds to an enroller 550.

In the case when the AP cannot support the NAN the configurator 530, which allows the AP to support the NAN, is used. In order for the configurator 530 to allow the AP to support the NAN, the configurator 530 and the enroller 550 are devices that are currently connected or have been previously connected to each other. Further, the configurator 530 performs an operation similar to that of the enroller 450 described with respect to FIG. 4.

In step 501, in a state where the configurator 530 and the enroller 550 are connected, the enrollee 310 supports the NAN based on NAN sync beacons.

In step 503, the enrollee 510 discovers a neighboring device, for example, the configurator 530, located within a predetermined range from the enrollee 510, and perform synchronization with the discovered configurator 530. At this time, when a list of service IDs includes a service ID of an initial setup (e.g., easy setup) service (e.g., Service ID=EasySetup (DPP)), the enrollee 510 performs processes for configuring a next initial connection.

In step 505, after the discovery and synchronization processes are completed, the enrollee 510 receives, from the configurator 530, a NAN SDF publish message indicating that access to the network can be provided. The NAN SDF publish message includes at least one of Type=Unsolicited, Discovery Range Limited:1, WLAN infrastructure Attribute, Device Role:STA, BSSID, operation channel, PE(C), and NonceC.

PE(C) is an ephemeral key value of the configurator 530 and may be determined based on Equation (5) below.

$$PE(C)=NonceE*PI(C) \quad (5)$$

In Equation (5), NonceE is a random nonce, and the PI(C) denotes a unique identity key of the configurator 530.

In step 507, the enrollee 510 having received the NAN SDF publish message transmits, to the configurator 530, a NAN SDF follow-up message indicating that the user confirmation required for authorization has been completed. The NAN SDF follow-up message includes at least one of Type=Passive, Discovery Range Limited:1, PE(E), and NonceE.

In step 509, and the enrollee 510 creates a shared secret.

In step 511, the configurator 530 identifies the user confirmation required for authorization based on the NAN SDF follow-up message received from the enrollee 510, and in step 513, creates the shared secret.

In step 515, the configurator 530 identifies an acceptance status of the subscription of the enrollee 510 and transmits the NAN SDF follow-up message including configuration data (e.g., ConfigData) to the enrollee 510.

In step 517, the configurator 530 cancels the publication with the enrollee 510 to allow another device to subscribe in step 517, and in step 519, the enrollee 510 cancels the subscription in step 519.

In step 521, the enrollee 510 and the enroller 550 perform discovery through one channel scan.

In step 523, the enrollee 510 and the enroller 550 perform a secure connection by using the configuration data (e.g., ConfigData).

Accordingly, in the method of configuring the connection between devices where the STA receives permission for a subscription from the AP and the AP cannot support the NAN, the enrollee 510 of the STA may make a request for subscribing to the configurator 530 of the STA connected to the enroller 550 of the AP, thereby making the connection with the enroller 550 of the AP.

Figure 6:
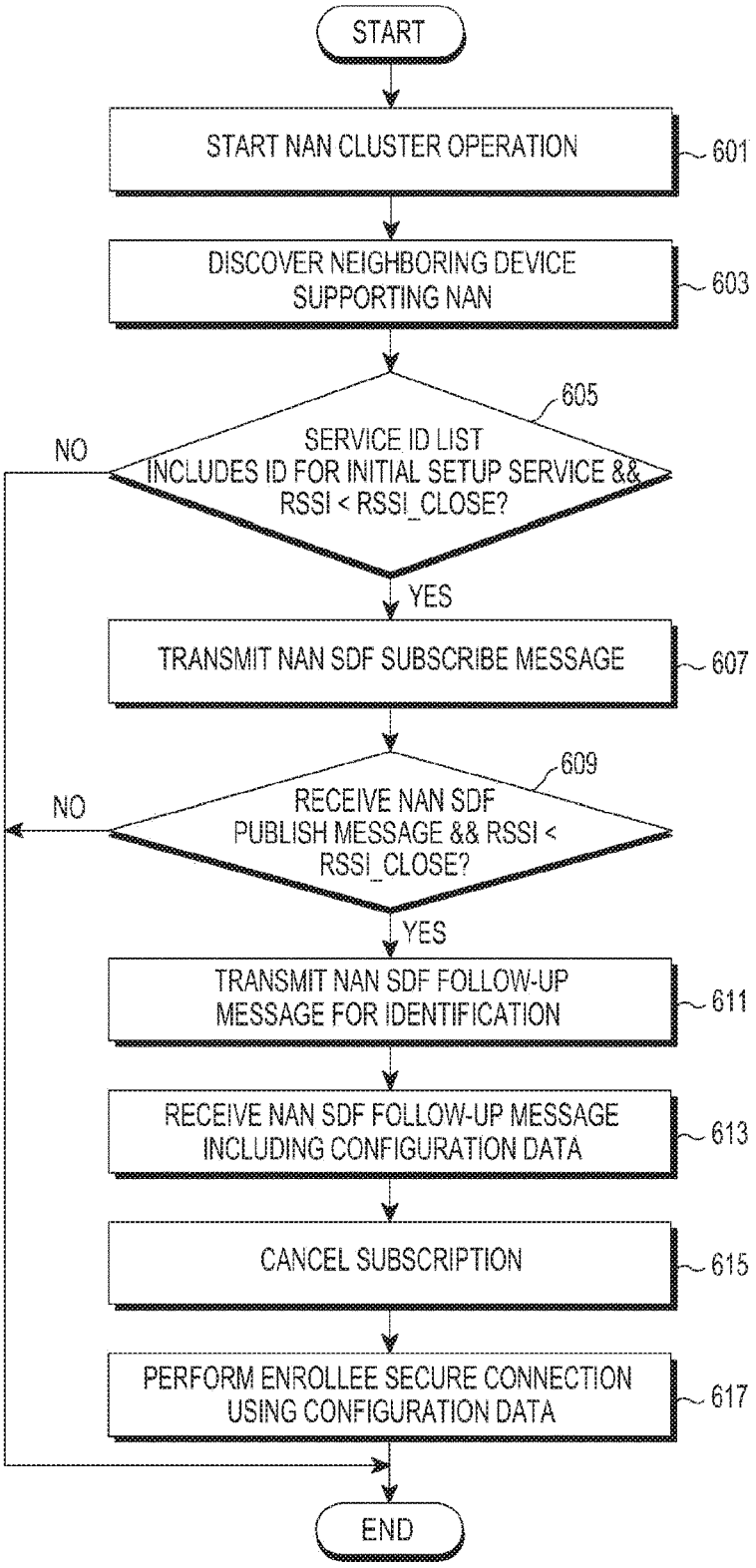
FIG. 6 is a flowchart of a method by which an enrollee configures a connection between devices in a communication system, according to an embodiment of the present disclosure.

FIG. 6 is a flowchart of a method by which an enrollee configures a connection between devices in a communication system, according to an embodiment of the present disclosure.

Referring to FIG. 6, in step 601, the enrollee starts a device setup operation by a NAN cluster that performs a master function in step 601. The NAN cluster may be the enrollee of FIG. 2 or 3.

In step 603, the enrollee discovers at least one neighboring device (i.e., the configurator or enroller), which supports the NAN, based on NAN sync beacons.

In step 605, the enrollee determine whether a list of service IDs includes an ID of an initial setup (e.g., easy setup) service and whether the discovered neighbor is located within a predetermined range based on an RSSI value of the discovered neighboring device (RSSI<RSSI_Close).

When all the conditions of step 605 are met, then in step 607, the STA transmits a NAN SDF subscribe message for the subscription to the EasySetup service to the configurator or the enroller.

When all the conditions of step 605 are not met, the process ends.

In step 609, the enrollee determines whether a NAN SDF publish message corresponding to the NAN SDF subscribe message is received from the configurator or the enroller and whether the device is located within a predetermined range from the configurator or the enroller based on the RSSI value of the NAN SDF publish message (RSSI<RSSI_Close).

When all the conditions of step 609 are met, then in step 611, the enrollee transmits a NAN SDF follow-up message for identification to the configurator or the enroller.

When all the conditions of step 609 are not met, the process ends.

In step 613, the enrollee receives the NSN SDF follow-up message including configuration data from the configurator or the enroller in step 613.

Then, in step 615, the enrollee cancels the subscription, and in step 617, performs a secure connection with the enroller using the configuration data based on the WLAN.

Figure 7:
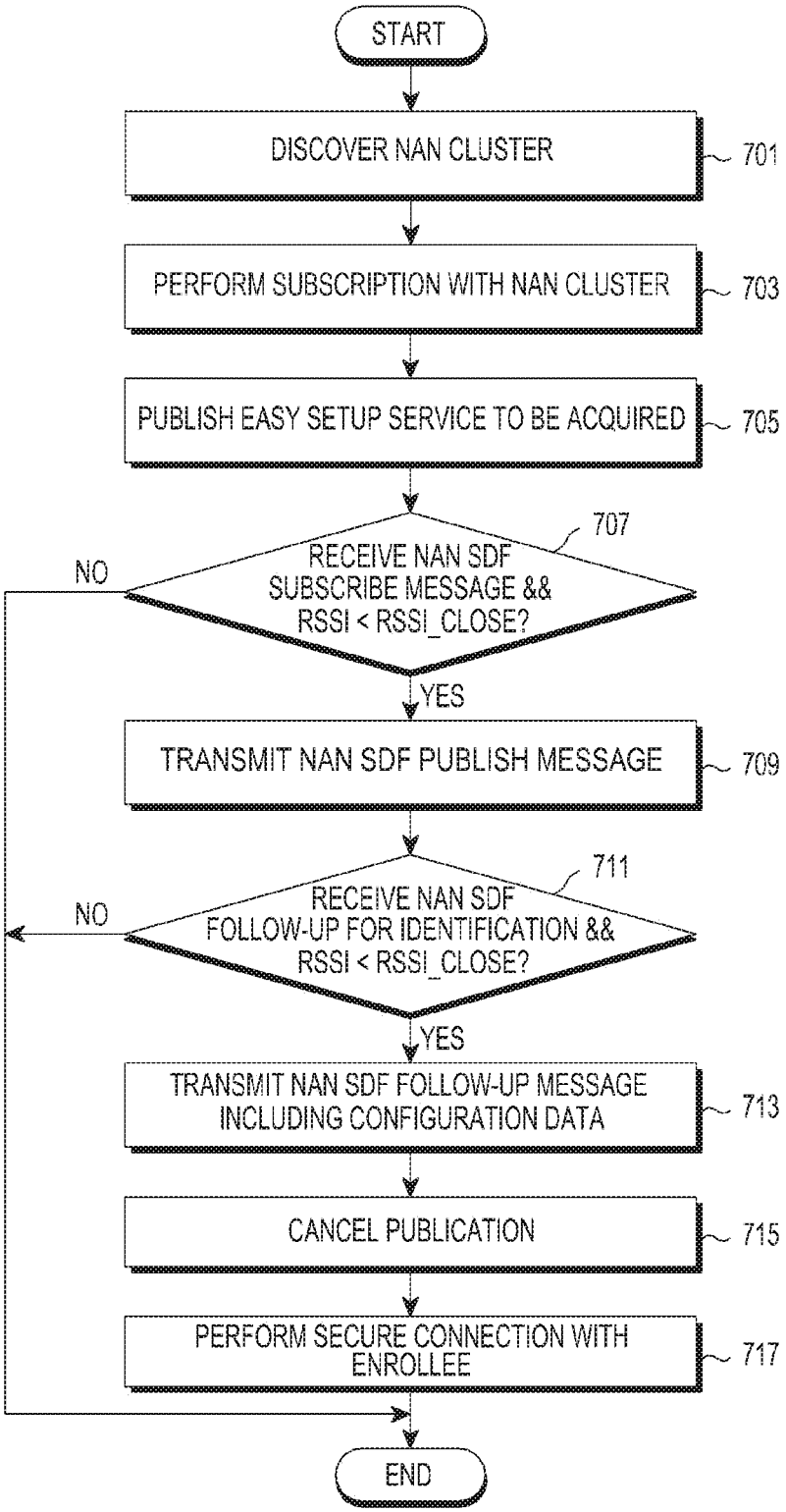
FIG. 7 is a flowchart of a method by which an enroller or a configurator configures a connection between devices in a communication system, according to an embodiment of the present disclosure.

FIG. 7 is a flowchart of a method by which an enroller or a configurator configures a connection between devices in a communication system, according to an embodiment of the present disclosure.

Referring to FIG. 7, when the enroller of the AP supports the NAN, the connection between the STA and the AP is configured by the enroller of the AP without any additional device. However, when the enroller of the AP does not support the NAN, the connection between the STA and the AP should be configured through an additional device, i.e., the configurator of the STA. In this case, the configurator of the STA performs the same operation as that of the enroller of the AP. The configurator of the STA is a device which is currently connected or has been previously connected to the enroller of the AP.

In step 701, the enroller or the configurator discovers the enrollee, which performs a NAN cluster operation, as the device supporting the NAN.

In step 703, the enroller or the configurator performs the subscription with the discovered NAN cluster, and in step 705, publishes the EasySetup Service to be acquired.

In step 707, the enroller or the configurator determines whether the NAN SDF subscribe message is received from the enrollee and whether the enroller or the configurator is located within a predetermined range of the enrollee based on an RSSI value of the NAN SDF subscribe message (RSSI<RSSI_Close).

When all the conditions of step 707 are met, then in step 709, the enroller or the configurator transmits the NAN SDF publish message corresponding to the NAN SDF subscribe message to the enrollee. At this time, the enroller or the configurator may identify user confirmation required for authorization.

When all the conditions of step 707 are not met, the process ends.

In step 711, the enroller or the configurator determines whether a NAN SDF follow-up message for the identification is received from the enrollee and whether the enroller or the configurator is located within a predetermined range from the enrollee based on an RSSI value of the NAN SDF follow-up message (RSSI<RSSI_Close).

When all the conditions of step 711 are met, then in step 713, the enroller or the configurator transmits the NAN SDF follow-up message including configuration data to the enrollee.

When all the conditions of step 711 are not met, the process ends.

In step 715, the enroller or the configurator cancels the publication, and in step 717, performs a secure connection with the enrollee based on the WLAN.

Figure 8:
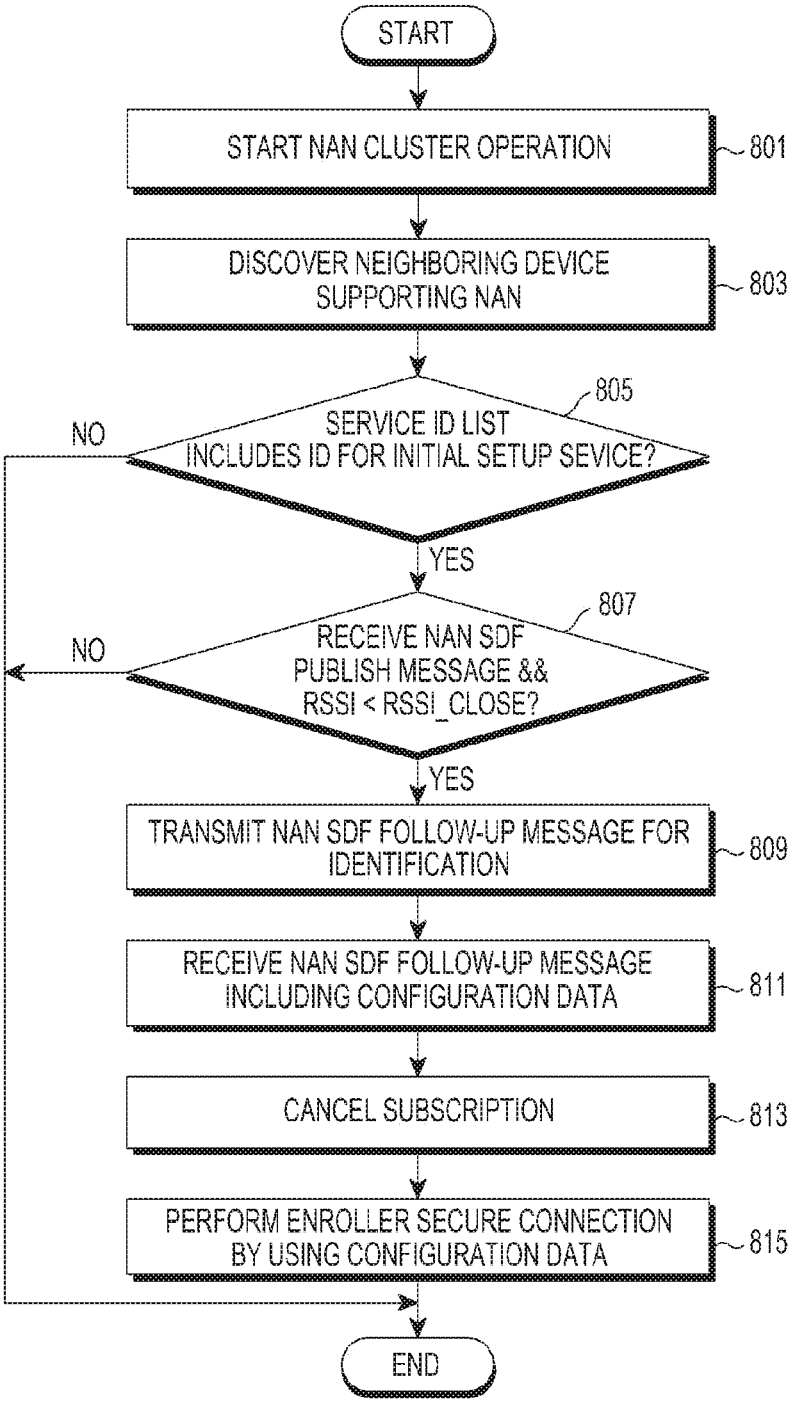
FIG. 8 is a flowchart of a method by which an enrollee configures a connection between devices in a communication system according to an embodiment of the present disclosure.

FIG. 8 is a flowchart of method by which an enrollee configures a connection between devices in a communication system, according to an embodiment of the present disclosure.

Referring to FIG. 8, in step 801, the enrollee starts a device setup operation by a NAN cluster that performs a master function. The NAN cluster may be the enrollee of FIG. 4 or 5.

In step 803, the enrollee discovers at least one neighboring device (i.e., the configurator or enroller), which supports the NAN, based on NAN sync beacons.

In step 805, the enrollee identifies whether a list of service IDs includes an ID of an initial setup (e.g., easy setup) service.

When the list of the service IDs includes the ID of the initial setup (easy setup) service, the enrollee anticipates that an operation for the initial setup will be performed and performs step 807.

In contrast, when the list of the service IDs does not include the ID of the initial setup (easy setup) service, the enrollee does not anticipate that an operation for the initial setup will be performed and waits for another operation. That is, the enrollee ends the operation for the initial setup.

In step 807, the enrollee determines whether a NAN SDF publish message is received from the configurator or the enroller and whether the enrollee is located within a predetermined range from the configurator or the enroller based on the RSSI value of the NAN SDF publish message (RSSI<RSSI_Close).

When all the conditions of step 807 are met, then in step 809, the enrollee transmits a NAN SDF follow-up message for identification to the configurator or the enroller.

When all the conditions of step 807 are not met, the process ends.

In step 811, the enrollee receives the NSN SDF follow-up message including configuration data from the configurator or the enroller.

In step 813, the enrollee cancels the subscription, and in step 815, performs a secure connection with the enroller by using the configuration data based on the WLAN.

Figure 9:
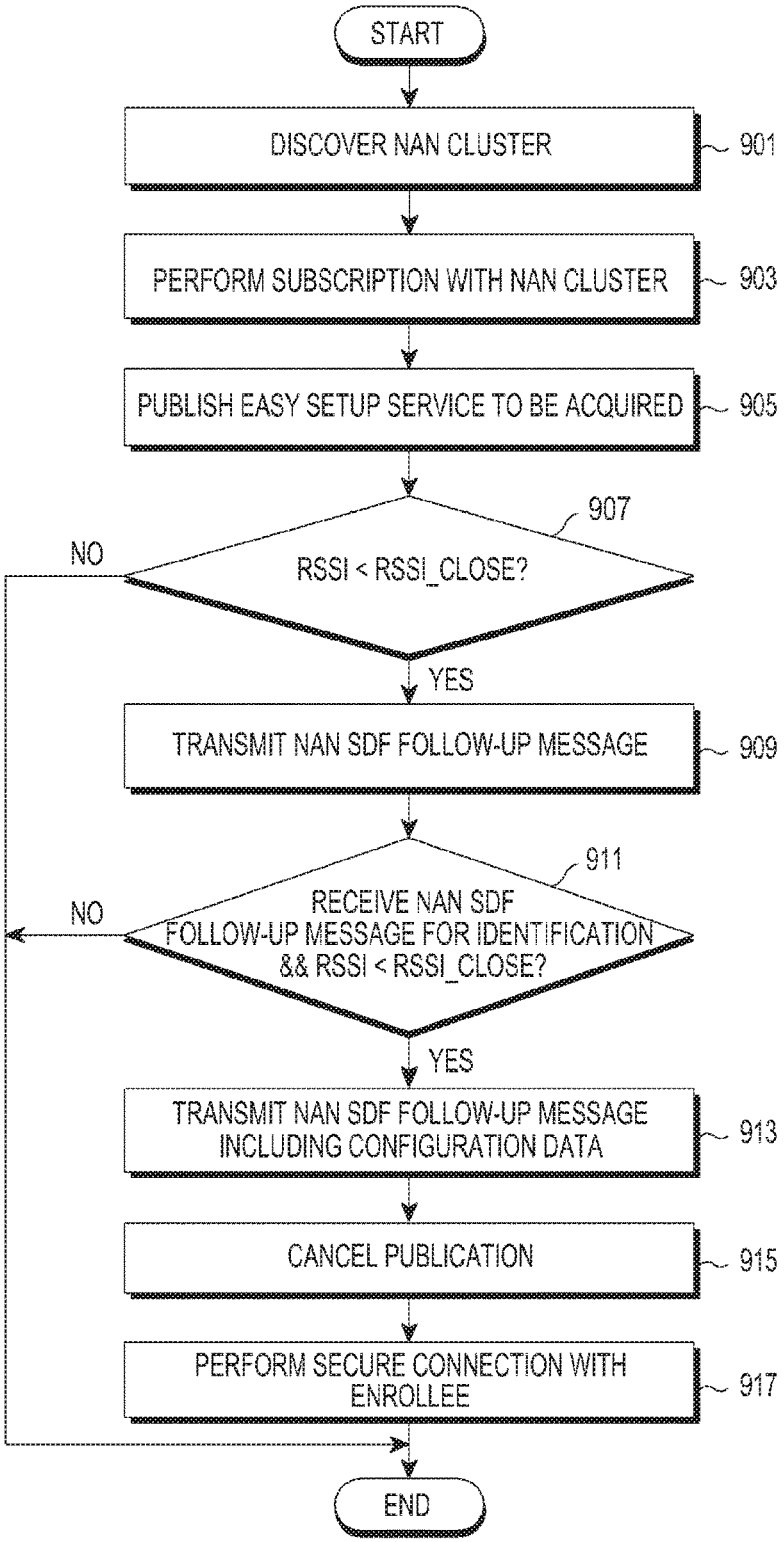
FIG. 9 is a flowchart of a method by which an enroller or a configurator configures a connection between devices in a communication system, according to an embodiment of the present disclosure.

FIG. 9 is a flowchart of a method by which an enroller or a configurator configures a connection between devices in a communication system, according to an embodiment of the present disclosure.

Referring to FIG. 9, when the enroller of the AP supports the NAN, the connection between the STA and the AP is configured by the enroller of the AP without any additional device. However, when the enroller of the AP does not support the NAN, the connection between the STA and the AP should be configured through an additional device, i.e., the configurator of the STA. In this case, the configurator of the STA performs the same operation as that of the enroller of the AP. The configurator of the STA is a device which is currently connected or has been previously connected to the enroller of the AP.

In step 901, the enroller or the configurator discovers the enrollee, which performs a NAN cluster operation, as the device supporting the NAN.

In step 903, the enroller or the configurator performs the subscription with the discovered NAN cluster, and in step 905, publishes the EasySetup Service to be acquired.

In step 907, the enroller or the configurator determines whether the enroller or the configurator is located within a predetermined range of the enrollee based on an RSSI of the enrollee (RSSI<RSSI_Close).

When the enroller or the configurator is located with the predetermined range the enrollee based on the RSSI value of the enrollee, then in step 909, the enroller or the configurator transmits the NAN SDF publish message to the enrollee.

When the enroller or the configurator is not located within the predetermined range of the enrollee, the process ends.

In step 911, the enroller or the configurator receives a NAN SDF follow-up message for the identification from the enrollee of the STA and determines whether the enroller or the configurator is located within the predetermined range of the enrollee based on an RSSI of the NAN SDF follow-up message (RSSI<RSSI_Close) in step 911.

When the enroller or the configurator is located within the predetermined range of the enrollee based on the RSSI of the NAN SDF follow-up message, then in step 913, the enroller or the configurator transmits the NAN SDF follow-up message including configuration data to the enrollee.

When the enroller or the configurator is not located within the predetermined range of the enrollee, the process ends.

In step 915, the enroller or the configurator cancels the publication, and in step 917 performs a secure connection with the enrollee based on the WLAN.

Figure 10:
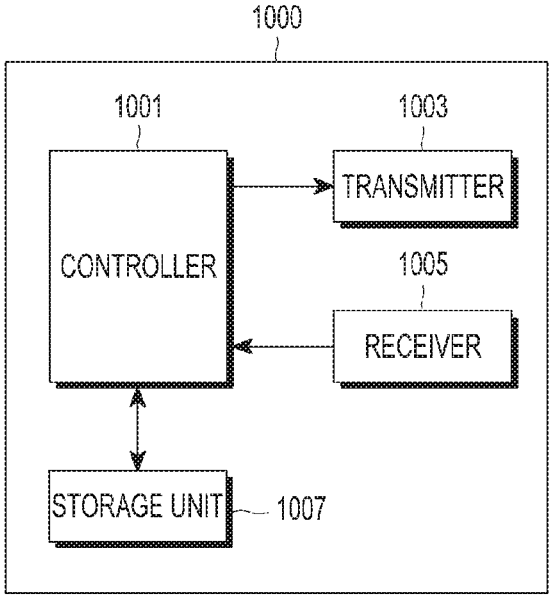
FIG. 10 is a block diagram of a configuration of an station (STA), which configures a connection between devices in a communication system, according to an embodiment of the present disclosure.

According to various embodiments of the present disclosure, in a method of configuring a connection between an AP and a STA the device can be automatically recognized without the need to perform tagging and QR code scanning between the devices, so that high usability is expected. The method of configuring the connection between devices is the most suitable method for a price sensitive IoT device since the connection between devices can be made through a Wi-Fi chip alone. The method of configuring the connection between devices allows for service discovery frames to be exchanged within a time limit through the NAN cluster and determines a proximity based on a signal strength of the received NAN frame and time synchronization information, so as to enhance security. The method of configuring the connection between devices can reduce a connection process to the same level as that of a password method through the exchange of information in the NAN, thereby reducing signal overhead. FIG. 10 is a block diagram of a configuration of a station (STA), which configures a connection between devices in a communication system, according to an embodiment of the present disclosure.

Referring to FIG. 10, an STA 1000 is provided. The STA 1000 corresponds to an enrollee and a configurator that performs the connection between devices in the communication system according to the scenario in which the STA directly makes a request for subscribing to the AP or the scenario in which the STA receives permission for a subscription from the AP.

As shown in FIG. 10, the STA 1000 includes a controller 1001, a transmitter 1003, a receiver 1005, and a storage unit 1007.

The controller 1001 controls the general operation of the STA 1000 and, in particular, controls an operation for configuring the connection between devices. Since an operation related to the operation for configuring the connection between the devices has been described with referent to FIGS. 2 to 9, a detailed description thereof will be omitted.

The transmitter 1003 receives various signals and various messages from other entities included in the communication system according to a control of the controller 1001. Since the various signals and the various messages received by the transmitter 1003 have been described with reference to FIGS. 2 to 9, a detailed description thereof will be omitted herein.

The receiver 1005 receives various signals and various messages from other entities included in the communication system according to a control of the controller 1001. Since the various signals and the various messages received by the receiver 1005 have been described with reference to FIGS. 2 to 9, a detailed description thereof will be omitted herein.

The storage unit 1007 stores programs and various data related to the operation for configuring the connection between devices, which is performed by the STA 1000 according to a control of the controller 1001. Further, the storage unit 1007 stores various signals and various message received from the other entities by the receiver 1005.

Although FIG. 10 illustrates that the STA 1000 is implemented by separate units such as the controller 1001, the transmitter 1003, the receiver 1005, and the storage unit 1007, the STA 1000 can be implemented in the form in which at least two of the controller 1001, the transmitter 1003, the receiver 1005, and the storage unit 1007 are integrated. Further, the STA 1000 can be implemented by one processor.

Figure 11:
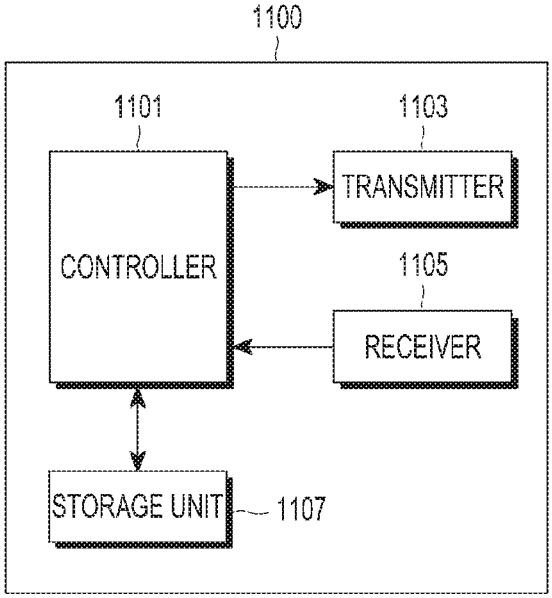
FIG. 11 is a block diagram of a configuration of an access point (AP), which configures a connection between devices in a communication system according to an embodiment of the present disclosure.

FIG. 11 is a block diagram of a configuration of an access point (AP), which configures a connection between devices in a communication system, according to an embodiment of the present disclosure.

Referring to FIG. 11, an AP 1100 is provided. The AP 1100 corresponds to the enroller that performs the connection between devices in the communication system according to the scenario in which the STA directly makes a request for subscribing to the AP or the scenario in which the STA receives permission for a subscription from the AP of the present disclosure.

As shown in FIG. 11, the AP 1100 includes a controller 1101, a transmitter 1103, a receiver 1105, and a storage unit 1107.

The controller 1101 controls the general operation of the AP 1100 and, in particular, controls an operation for configuring the connection between devices. Since an operation related to the operation for configuring the connection between the devices has been described with reference to FIGS. 2 to 9, a detailed description thereof will be omitted.

The transmitter 1103 receives various signals and various messages from other entities included in the communication system according to a control of the controller 1101. Since the various signals and the various messages received by the transmitter 1103 have been described with reference to FIGS. 2 to 9, a detailed description thereof will be omitted herein.

The receiver 1105 receives various signals and various messages from other entities included in the communication system according to a control of the controller 1101. Since the various signals and the various messages received by the receiver 1105 have been described with reference to FIGS. 2 to 9, a detailed description thereof will be omitted herein.

The storage unit 1107 stores programs and various data related to the operation for configuring the connection between devices, which is performed by the AP 1100 according to a control of the controller 1101. Further, the storage unit 1107 stores various signals and various message received from the other entities by the receiver 1105.

Although FIG. 11 illustrates that the AP 1100 is implemented by separate units such as the controller 1101, the transmitter 1103, the receiver 1105, and the storage unit 1107, the AP 1100 can be implemented in the form in which at least two of the controller 1101, the transmitter 1103, the receiver 1105, and the storage unit 1107 are integrated. Further, the AP 1100 can be implemented by one processor.

Although various embodiments have been described in the detailed description of the present disclosure, the present disclosure may be modified in various forms without departing from the scope of the present disclosure. Thus, the scope of the present disclosure is not defined merely based on the described embodiments, but rather by the following claims and their equivalents.

What is claimed is:

1. A method of configuring a connection with a second device, which provides access to a network, by a first device *supporting a neighbor awareness network* (*NAN*) in a communication system, the method comprising:

discovering, by [a processor of] the first device, the second device supporting [a neighbor awareness network (NAN)] *the NAN* and located within a predetermined range from the first device;

determining an ephemeral key of the first device based on a unique identity value of the first device and a random value;

transmitting, [by the processor] to the second device, a [subscribe] *first* message for subscribing to the second device, which includes the ephemeral key of the first device [for identifying the first device] and the random value; and receiving, [by the processor] from the second device, a [publish] *second* message [for] indicating that the access to the network [is] *can be* provided, which includes an ephemeral key of the second device [for identifying the second device] *and information indicating that the access to the network can be provided*, wherein the ephemeral key of the second device is determined, by the second device, based on a unique identity of the second device and the random value being extracted from the [subscribe] *first* message.

2. The method of claim 1, wherein the second device provides the access to the network, or is connected or was previously connected to a third device that provides the access to the network.

3. The method of claim 1, further comprising:

receiving a user confirmation for authorization of a subscription to the second device;

when the user confirmation is received, transmitting, to the second device, a follow-up message indicating that subscription to the second device has been confirmed;

receiving, from the second device, a follow-up response message, which includes encrypted configuration data; and canceling the subscription to the second device.

4. The method of claim 3, wherein the [subscribe] *first* message includes *an indication of* at least one of a type of the [subscribe] *first* message which indicates that the subscription to the second device is requested, *or* the predetermined range[, the ephemeral key of the first device, and the random value].

5. The method of claim 3, wherein the [publish] *second* message includes *an indication of* at least one of a type of the [publish] *second* message which indicates that the access to the network [can be] *is* provided, the predetermined range, information on wireless location area network (WLAN) connection attributes, information on a role of the second device, a basic service set identifier (ID) of the network, information on a channel of a WLAN, [the ephemeral key of the second device, and] *or* the random value*, and wherein the information indicating that the access to the network can be provided includes the type of the second message which indicates that the access to the network can be provided.*

6. The method of claim 1, further comprising:

transmitting, to the second device, a follow-up message, which includes the ephemeral key of the first device and indicates that a subscription to the second device has been confirmed;

receiving, from the second device, encrypted configuration data; and canceling the subscription to the second device.

7. The method of claim 6, wherein the [publish] *second* message includes *an indication of* at least one of a type of the [publish] *second* message which indicates that the access to the network can be provided without a request for subscription from the first device, the predetermined range, information on WLAN connection attributes, information on a role of the second device, a basic service set ID of the network, information on a channel of a WLAN, [the ephemeral key of the second device, and] *or* the random value*, and wherein the information indicating that the access to the network can be provided includes the type of the second message which indicates that the access to the network can be provided without the request for subscription from the first device.*

8. The method of claim 6, wherein the follow-up message includes *an indication of* at least one of a type of the follow-up message which indicates that the subscription to the second device has been confirmed, the predetermined range, [the ephemeral key of the first device,] the random value, [and] *or* a request for performing a role of a configurator.

9. A method of configuring a connection with a first device *supporting a neighbor awareness network (NAN) based on NAN sync beacons*, by a second device *supporting the NAN* which provides access to a network in a communication system, the method comprising:

receiving, [by a processor of the second device] from the first device, a [subscribe] *first* message for subscribing to the second device, which includes an ephemeral key of the first device [for identifying the first device] and a random value;

*determining an ephemeral key of the second device based on a unique identity value of the second device and the random value being extracted from the first message;* and transmitting, [by the processor] to the [second] *first* device, a [publish] *second* message [for] indicating that the access to the network [is] *can be* provided, which includes [an] *the* ephemeral key of the second device [for identifying the second device] *and information indicating that the access to the network can be provided*, wherein the second device supports a neighbor awareness network (NAN) and is located within a predetermined range from the first device, and wherein the ephemeral key of the first device is determined based on a unique identity value of the first device and the random value[, and the ephemeral key of the second device is determined based on a unique identity of the second device and the random value being extracted from the subscribe message].

10. The method of claim 9, wherein the second device provides the access to the network, or is connected or was previously connected to a third device that provides the access to the network.

11. The method of claim 9, further comprising:

when a user confirmation for authorization of subscription of the second device is received at the first device, receiving, from the first device, a follow-up message indicating that subscription to the second device has been confirmed;

transmitting, to the first device, a follow-up response message, which includes the encrypted configuration data; and canceling publication of the second device.

12. The method of claim 11, wherein the [subscribe] *first* message includes *an indication of* at least one of a type of the [subscribe] *first* message which indicates that the subscription to the second device is requested, *or* the predetermined range[, the ephemeral key of the first device, and the random value].

13. The method of claim 11, wherein the [publish] *second* message includes *an indication of* at least one of a type of the [publish] *second* message which indicates that the access to the network [can be] *is* provided, the predetermined range, information on wireless location area network (WLAN) connection attributes, information on a role of the second device, a basic service set identifier (ID) of the network, information on a channel of a WLAN, [the ephemeral key of the second device, and] *or* the random value*, and wherein the information indicating that the access to the network can be provided includes the type of the second message which indicates that the access to the network can be provided.*

14. The method of claim 9, further comprising:

receiving, from the first device, a follow-up message, which includes the ephemeral key of the first device and indicates that subscription to the second device has been confirmed;

transmitting the encrypted configuration data, to the first device; and canceling the publication of the first device.

15. The method of claim 14, wherein the [publish] *second* message includes *an indication of* at least one of a type of the [publish] *second* message which indicates that the access to the network can be provided without a request for subscription from the first device, the predetermined range, information on WLAN connection attributes, information on a role of the second device, a basic service set ID of the network, information on a channel of a WLAN, [the ephemeral key of the second device, and] *or* the random value*, and wherein the information indicating that the access to the network can be provided includes the type of the second message which indicates that the access to the network can be provided without the request for subscription from the first device.*

16. The method of claim 14, wherein the follow-up message includes *an indication of* at least one of a type of the follow-up message which indicates that the subscription to the second device has been confirmed, the predetermined range, [the ephemeral key of the first device,] the random value, [and] *or* a request for performing a role of a configurator.

17. [An apparatus for configuring] *A first device adapted to support a neighbor awareness network (NAN) based on NAN sync beacons and to configure* a connection with a second device *supporting the NAN*, which provides access to a network[, by a first device in] *of* a communication system, the [apparatus] *first device* comprising:

a transceiver; and a processor configured to[control to]:

discover the second device supporting a neighbor awareness network (NAN) and located within a predetermined range from the first device,

[determine] *generate* an ephemeral key of the first device based on a unique identity value of the first device and a random value, control the transceiver to transmit, to the second device, a [subscribe] *first* message for subscribing to the second device, which includes the ephemeral key of the first device [for identifying the first device] and the random value, and control the transceiver to receive, from the second device, a [publish] *second* message [for] indicating that the access to the network [is] *can be* provided, which includes an ephemeral key of the second device [for identifying the second device] *and information indicating that the access to the network can be provided*; and wherein the ephemeral key of the second device is determined, by the second device, based on a unique identity of the second device and the random value being extracted from the [subscribe] *first* message.

[18. The apparatus of claim 17, wherein the second device provides the access to the network, or is connected or was previously connected to a third device that provides the access to the network.]

19. The [apparatus] *first device* of claim 17, wherein the processor [controls the transceiver] *is further configured* to:

receive, *via the transceiver,* a user confirmation for authorization of a subscription to the second device, when the user confirmation is received, transmit, *via the transceiver*, to the second device, a follow-up message indicating that subscription to the second device has been confirmed;

receive, from the second device, *via the transceiver*, a follow-up response message, which includes encrypted configuration data; and cancel the subscription to the second device.

20. The [apparatus] *first device* of claim 19, wherein the [subscribe] *first* message includes *an indication of* at least one of a type of the [subscribe] *first* message which indicates that the subscription to the second device is requested, *or* the predetermined range[, the ephemeral key of the first device, and the random value].

*21. The first device of claim 19, wherein the second message includes an indication of at least one of a type of the second message which indicates that the access to the network can be provided, the predetermined range, information on wireless location area network (WLAN) connection attributes, information on a role of the second device, a basic service set identifier (ID) of the network, information on a channel of a WLAN, the ephemeral key of the second device, or the random value, and*

*wherein the information indicating that the access to the network can be provided includes the type of the second message which indicates that the access to the network can be provided.*

*22. The first device of claim 17, wherein the processor is further configured to:*

*transmit, to the second device, via the transceiver, a follow-up message, which includes the ephemeral key of the first device and indicates that a subscription to the second device has been confirmed;*

*receive, from the second device, via the transceiver, encrypted configuration data; and*

*cancel the subscription to the second device.*

*23. The first device of claim 22, wherein the second message includes an indication of at least one of a type of the second message which indicates that the access to the network can be provided without a request for subscription from the first device, the predetermined range, information on wireless location area network (WLAN) connection attributes, information on a role of the second device, a basic service set ID of the network, information on a channel of a WLAN, the ephemeral key of the second device, or the random value, and*

*wherein the information indicating that the access to the network can be provided includes the type of the second message which indicates that the access to the network can be provided without the request for subscription from the first device.*

*24. The first device of claim 22, wherein the follow-up message includes an indication of at least one of a type of the follow-up message which indicates that the subscription to the second device has been confirmed, the predetermined range, the ephemeral key of the first device, the random value, or a request for performing a role of a configurator.*

* * * * *